United States Patent
Baird

(10) Patent No.: US 9,325,935 B2
(45) Date of Patent: Apr. 26, 2016

(54) PREVIEW WINDOW FOR VIDEO COMMUNICATIONS

(75) Inventor: Randall B. Baird, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 948 days.

(21) Appl. No.: 13/164,184

(22) Filed: Jun. 20, 2011

(65) Prior Publication Data

US 2012/0320142 A1 Dec. 20, 2012

(51) Int. Cl.
 *H04N 7/14* (2006.01)

(52) U.S. Cl.
 CPC ........................................ *H04N 7/14* (2013.01)

(58) Field of Classification Search
 USPC ........... 348/14.01, 14.02, 14.03, 14.08, 14.16
 See application file for complete search history.

(56) References Cited

U.S. PATENT DOCUMENTS

| | | | |
|---|---|---|---|
| 8,237,764 B1* | 8/2012 | Chen et al. ................. | 348/14.01 |
| 8,274,544 B2* | 9/2012 | Kurtz ..................... | H04N 7/142 348/14.01 |
| 8,977,571 B1* | 3/2015 | Bueche, Jr. ........ | G06Q 20/3223 705/44 |
| 2006/0126894 A1* | 6/2006 | Mori ...................... | H04N 7/142 382/103 |
| 2011/0249086 A1* | 10/2011 | Guo ....................... | H04N 7/147 348/14.12 |

OTHER PUBLICATIONS

"Fun That's Good for You—Xbox.com," downloaded from http://www.xbox.com/en-US/Kinect/healthyfun on Aug. 30, 2011, 4 pages.
YouTube—E3 2009: Project Natal Xbox 360 Announcement, http://www.youtube.com/watch?v=p2qlHoxPioM&feature=channel, downloaded Jun. 20, 2011, 3 pages.
YouTube—Xbox Project Natal Painting Demo, http://www.youtube.com/watch?v=ie02k3eAvxY, downloaded Jun. 20, 2011, 3 pages.
Free cartoon effect webcam download Download—Cartoon effect webcam, http://software.informer.com/geffree-cartoon-effect-webcam-download/, downloaded Jun. 20, 2011, 2 pages.

* cited by examiner

*Primary Examiner* — Duc Nguyen
*Assistant Examiner* — Assad Mohammed
(74) *Attorney, Agent, or Firm* — Parker Ibrahim & Berg LLC; James M. Behmke; Stephen D. LeBarron

(57) ABSTRACT

Generation of a preview window for video conferencing which is configured to output a silhouette of a user and output feedback on the user's facial position and surrounding lighting conditions. A user's image is captured with an input device and processed to create both the silhouette and indications which indicate if the user's facial position and surrounding light levels are suitable for the videoconference. The created silhouette and indications are outputted to a preview window in the user's video conferencing graphical user interface.

15 Claims, 12 Drawing Sheets

PREVIEW WINDOW FOR VIDEO COMMUNICATIONS

TECHNICAL FIELD

The present disclosure generally relates to communication technologies for image capturing and rendering.

BACKGROUND

The growth of video communication technologies have enabled remote users to communicate with each other in previously unknown ways. Using these video communication technologies, users can communicate in real time with each other through sight as well as sound. For example, a user may communicate to another user through video conferences.

DESCRIPTION OF EXAMPLE EMBODIMENTS

Overview

Figure 1A:
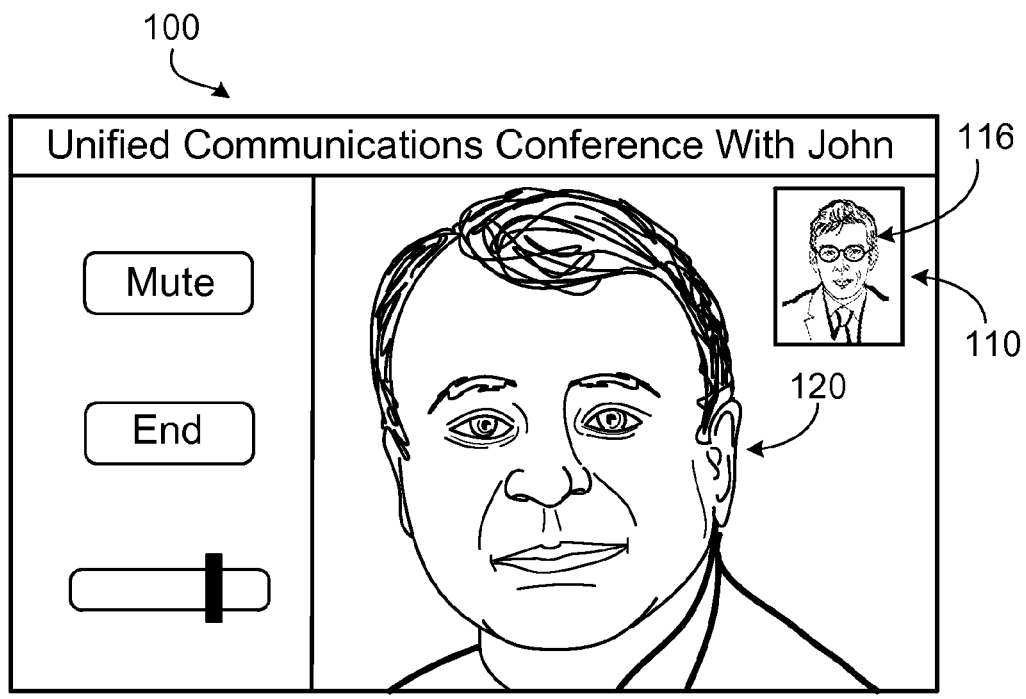
FIGS. 1A, 1B, 1C, 1D, 1E, 1F, and 1G illustrate an example of a graphical user interface with a preview window.

In one general aspect, a preview window for videoconference can be generated by a method comprising: presenting a first window and a second window in a graphical user interface (GUI), receiving, with an image capture module, information related to an image condition related to a second user in the videoconference, the image condition being selected from a group consisting of a lighting condition, an image balance condition, an image contrast condition, and a condition relating to a position of a head of the second user with respect to a camera that is configured to capture an image of the head, presenting, with an icon generation module, a silhouette of the second user in the second window, and determining whether the second user should adjust the image condition by comparing the image condition to a threshold image condition. Furthermore, based upon determining that the image condition does not meet the threshold image condition, presenting, with the GUI, an indication of the image condition in the second window and based upon determining that the image condition does meet the threshold image condition, presenting, with the GUI, the silhouette of the second user in the second window without presenting the presentation of the indication of the image condition in the second window.

In another general aspect, a preview window for a videoconference can be generated by a method comprising: presenting a first window and a second window in a graphical user interface (GUI), receiving, with an image capture module, information related to an image condition related to a second user in the videoconference, the image condition being selected from a group consisting of a positional condition of the second user within the second window and a rotational condition of the second user within the second window, wherein the rotational condition relates to whether a head of the second user is turned sideways or directly facing a camera that captures an image of the head to present in the second window, presenting, with an GUI, a silhouette of the second user in the second window, and determining whether the second user should adjust the image condition by comparing the image condition to a threshold image condition. Furthermore, based upon determining that the image condition does not meet the threshold image condition, presenting, with the GUI, an indication of the image condition in the second window, and based upon determining that the image condition does meet the threshold image condition, presenting, with the GUI, the silhouette of the second user in the second window without presenting the presentation of the indication of the image condition in the second window.

Details of one or more implementations are set forth in the accompanying drawings and the description herein. Other features and aspects will be apparent from the description, the drawings, and the claims.

DETAILED DESCRIPTION

In video conferencing applications, a graphical user interface (GUI) displays an image of a remote user for which the user of the GUI can communicate. These GUIs can also display a small preview window. These preview windows can display an image of the user so that the user may see how their image will be presented to the remote user's GUI. The presence of this preview window can help the user position themselves in front of their video camera and adjust ambient lighting conditions so as to transmit a more visually pleasing image to the remote user.

In some cases where an image of the user is displayed that shows the facial features of the user, these preview windows may become distracting for the user, so that instead of paying attention to the image of the remote user, a user may instead pay more attention to their own image in the preview window.

Instead of turning off the preview window, which does not provide visual feedback to the user regarding their position in the video camera, features are described for which a user can obtain visual feedback on their facial position and ambient lighting condition(s) while not having the distraction of seeing their actual facial features displayed in a preview window. To achieve this, there can be a display of preview window in a user's GUI. The preview window is configured to either display an image of the user, display a silhouette of the user or display an icon representing the user. The user may select which one of the visual outputs (i.e. the image, the silhouette or the icon) are displayed in the preview window. The user may make such a selection either before the preview window is rendered in the GUI and/or while the preview window is displayed in the GUI. The silhouette of the user may be, for example, an outline of a shape of the user's head and/or upper body. The silhouette may be, for example, represented in the preview window as a drawing of an outline of the head or body of the user, where the outline may be filled in with some uniform color, design or pattern. The silhouette may present, for example, a likeness of the head or body of the user.

Various indicators can also be displayed to the user through the silhouette to provide feedback to the user to inform the user that they need to adjust the position of their face and/or the ambient lighting conditions in order to be better positioned in the video camera's viewing angle. A system for outputting these indicators can determine which indicators are to be outputted to the preview window based off of image processing parameters received from the video camera.

FIG. 1A shows a video conferencing GUI 100. The GUI 100 is configured to visually output both the remote user's image 120, as well as a preview window 110 containing the user's image 116. The preview window 110 of the user's image 116 shows the actual facial features of the user in the video conference.

Figure 1B:
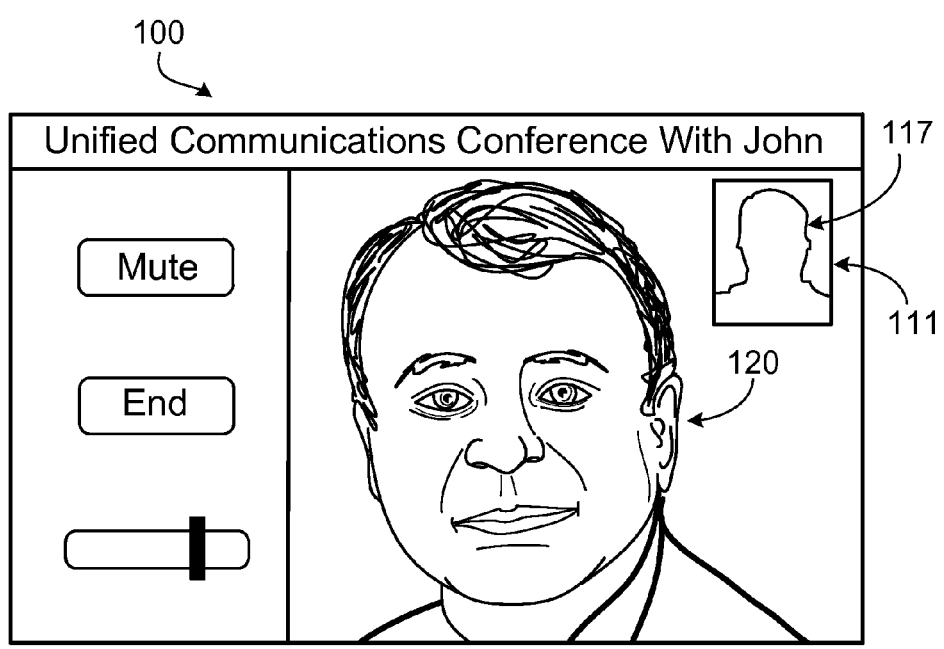

FIG. 1B shows an implementation, where instead of outputting the user's image 116 in the preview window 110 as in FIG. 1A, the preview window 111 in of the GUI 100 is configured to display a silhouette image 117 of the user in the preview window 111. The silhouette image 117 of the user in the preview window 111 may take the form of an outline of the user or an icon. In the implementation, both the silhouette 117 and the background around the silhouette are presented with no warning indicators, indicating that the position, size, rotation, and image quality of the preview window are of acceptable quality.

In the case of the icon, the user may select an icon that provides enough feedback regarding the user's actual head position in the preview window 111. This icon may include caricatures, such as another person's facial outline, a cartoon, or an image for which the user will not find distracting, such as a basic shape (e.g., a box or triangle).

Figure 1C:
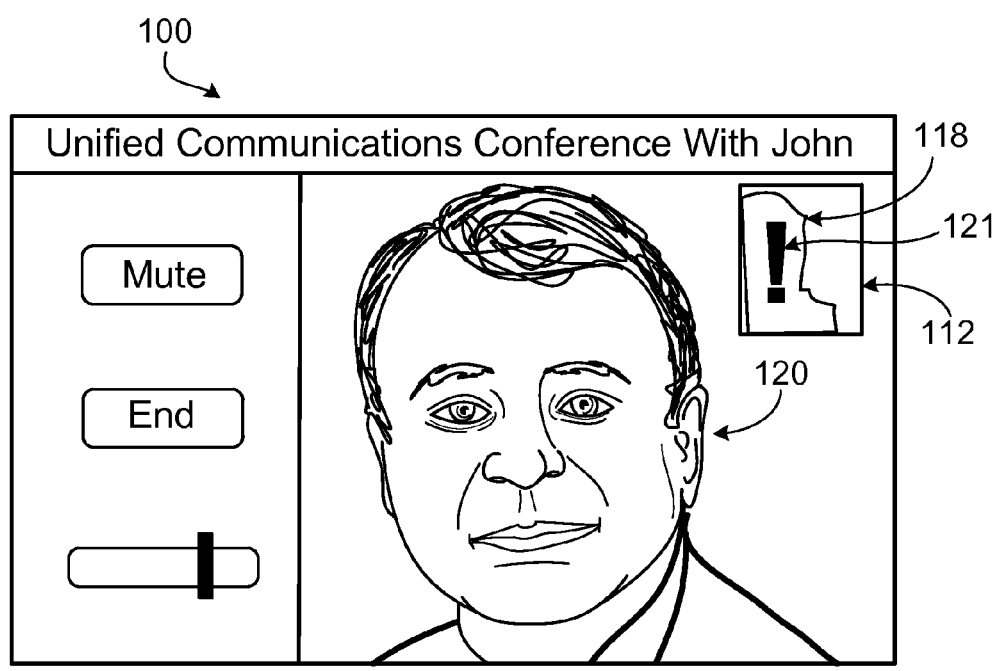

FIG. 1C shows an implementation where the preview window 112 of GUI 100 is configured to output a silhouette 118 of the user to indicate that the user's image is misaligned in the camera. Misalignment may be shown as the silhouette 118 being displayed to only partially be visible in the preview window, and/or by being accompanied by a misalignment indicator 121. The misalignment indicator 121 can indicate that the user is not within an area of the camera that permits the camera from fully capturing the head and/or upper body of the user. This misalignment indicator may include a symbol or other icon such as an exclamation point, a change in the coloration of the silhouette 118, a change in the background coloration around the silhouette 118, a dynamic or animated indication, such as the silhouette 118 blinking or subtly changing colors, a change in the color or shading around the border of the preview window, or any combination thereof, among others.

Figure 1D:
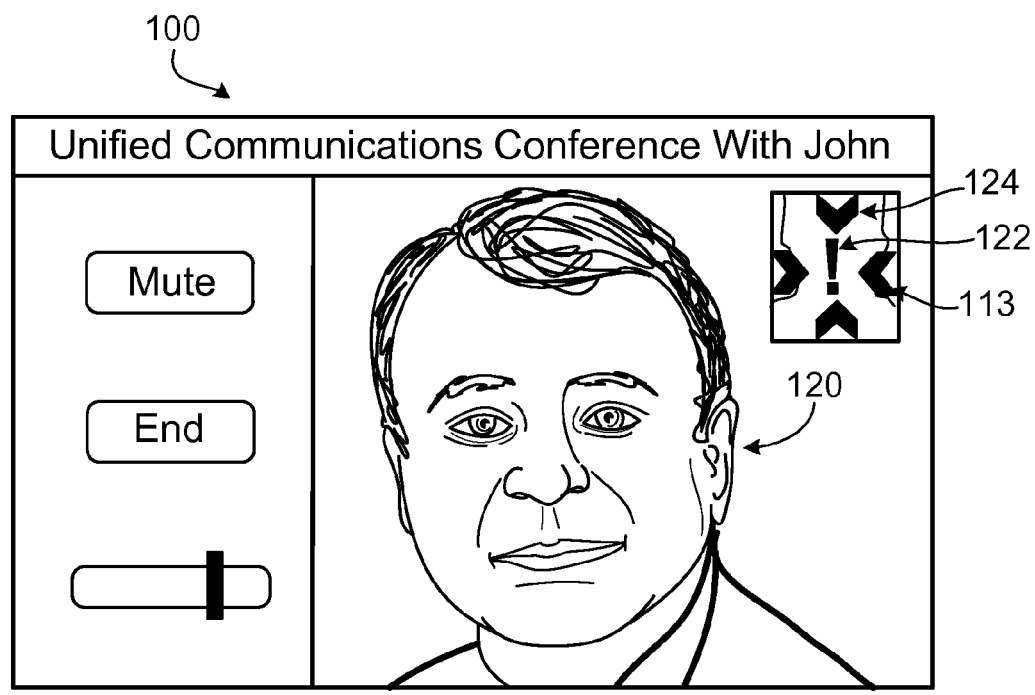

FIG. 1D shows an implementation where the preview window of GUI 100 is configured to output a silhouette 113 of the user to indicate that the user's image (e.g., head/facial outline) is positioned too close to the camera. An indication that the user's image is positioned too close to the camera may be shown through the silhouette 124 being zoomed into the window 113 such as to fully or mostly cover it, the superposition of an icon over the silhouette 124, and/or by being accompanied by a zoom out indicator, which may be represented by one or more icons situated around the edges of the silhouette 124. This zoom out indicator may also include a change in the coloration of the silhouette 124, a change in the background coloration around the silhouette 113, a dynamic or animated indication, such as the silhouette blinking or subtly changing colors, icons in the silhouette getting larger or smaller, a change in the color around the border of the preview window, a change in the line of the border (e.g., solid line, double lines, dots or dashes), or any combination thereof, among others.

Figure 1E:
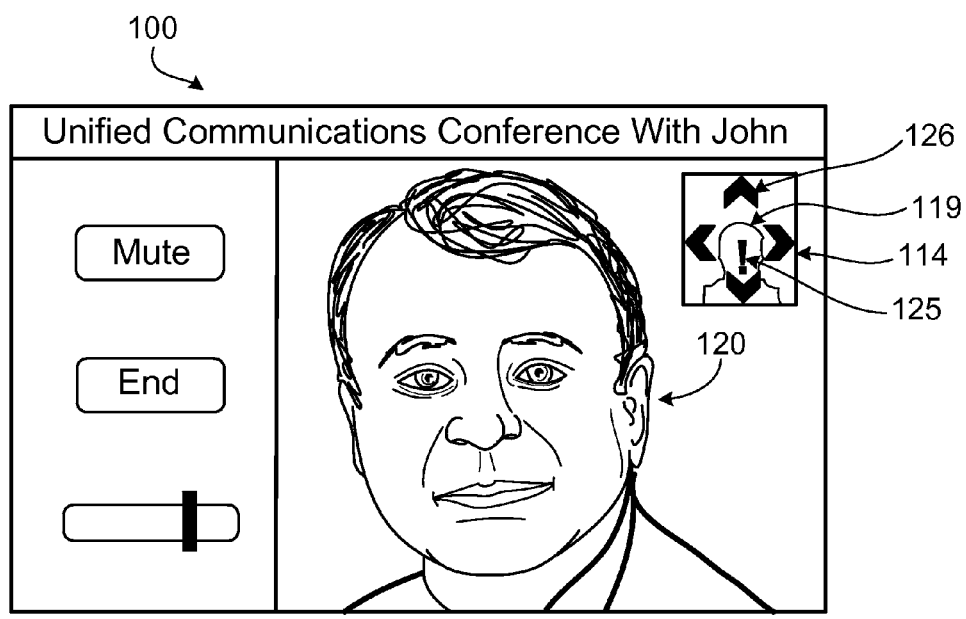

FIG. 1E shows an implementation where the preview window 114 of GUI 100 is configured to output a silhouette 119 of the user to indicate that the user's image is positioned too far away (e.g., too distant) from the camera. An indication that the user's image is positioned too far away from the camera may be shown through the silhouette 119 being zoomed away in the window such that the silhouette 119 becomes small in the preview window 114, by the superposition of an icon 125 over the silhouette, and/or by being accompanied by a zoomed in indicator, which may be represented by one or more icons situated around the edges of the silhouette 126. The zoomed out indicator may also include a change in the coloration of the silhouette 119, a change in the background coloration around the silhouette 119, a dynamic or animated indication, such as the silhouette 119 blinking or subtly changing colors, icons in the silhouette 119 getting smaller, a change in the color or line around the border of the preview window 114 or silhouette 119 (e.g., solid line, double lines, dots or dashes), or any combination of thereof, among others.

Figure 1F:
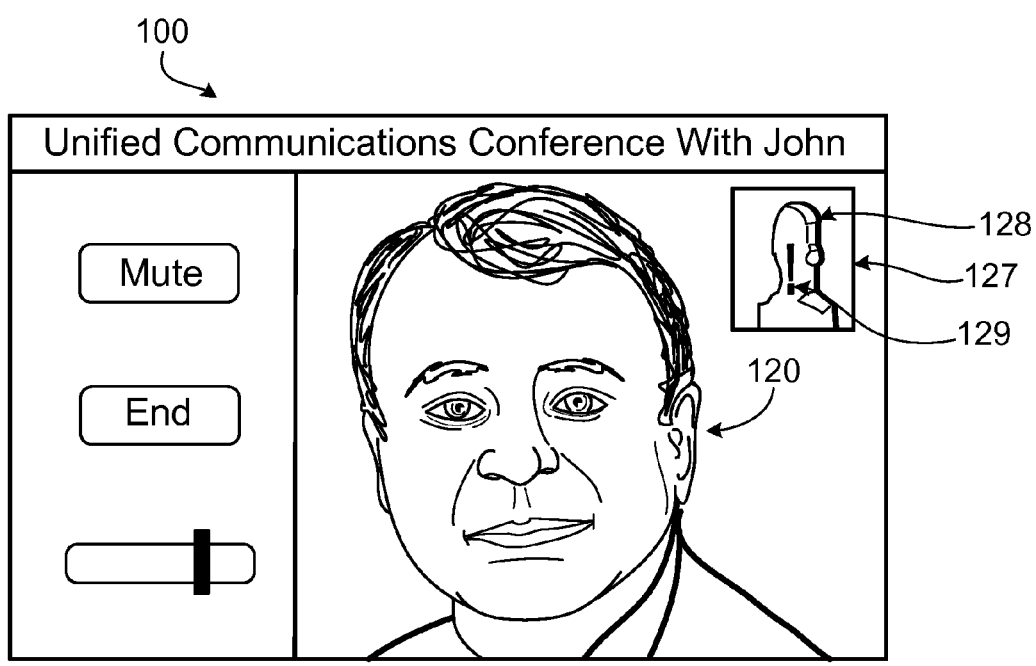

FIG. 1F shows an implementation where the preview window 127 of GUI 100 is configured to output a silhouette 128 of the user to indicate that the user is rotated with respect to the camera. An indication that the user is rotated may be shown through the silhouette 127 being represented as a three dimensional representation of the silhouette being rotated in the preview window 127. The rotated silhouette 128 may also include a rotation indicator, which may be represented by an icon 129 superposed over the rotated silhouette 128. The rotation indicator may also include changing the coloration of the silhouette 128, a dynamic or animated indication, such as the silhouette 128 blinking or subtly changing colors, icons in the silhouette, a change in the color or line around the border of the preview window 127 or silhouette 128 (e.g., solid line, double lines, dots or dashes), or any combination of thereof, among others.

Figure 1G:
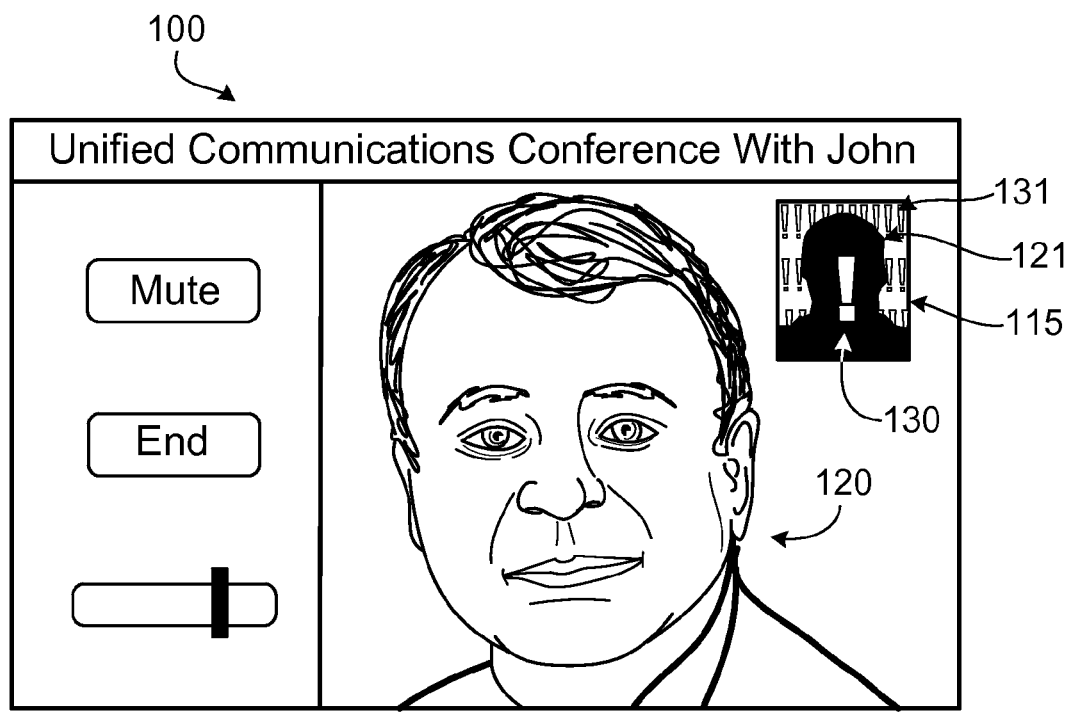

FIG. 1G shows an implementation where the preview window 115 of GUI 100 is configured to output a silhouette 121 of the user to indicate that there are poor, inadequate or insufficient lighting conditions in the user's environment. An indication that there are poor, inadequate or insufficient lighting conditions in the user's environment can be shown through a poor lighting indicator. The silhouette 121 may be darkened and an icon 130 superposed over the silhouette 121, to indicate that the user's face is unacceptably dark or shadowed. In addition, the background 131 has at least one icon superposed over it to indicate that the background 131 has poor color balance, is too light or dark, etc. These lighting indicators may include other changes in the coloration of the silhouette 121, a change in the background coloration around the silhouette 121, a dynamic or animated indication such as the silhouette blinking or subtly changing colors, a change in the color around the border or line of the preview window (e.g., solid line, double lines, dots or dashes), or any combination thereof, among others.

Figure 2:
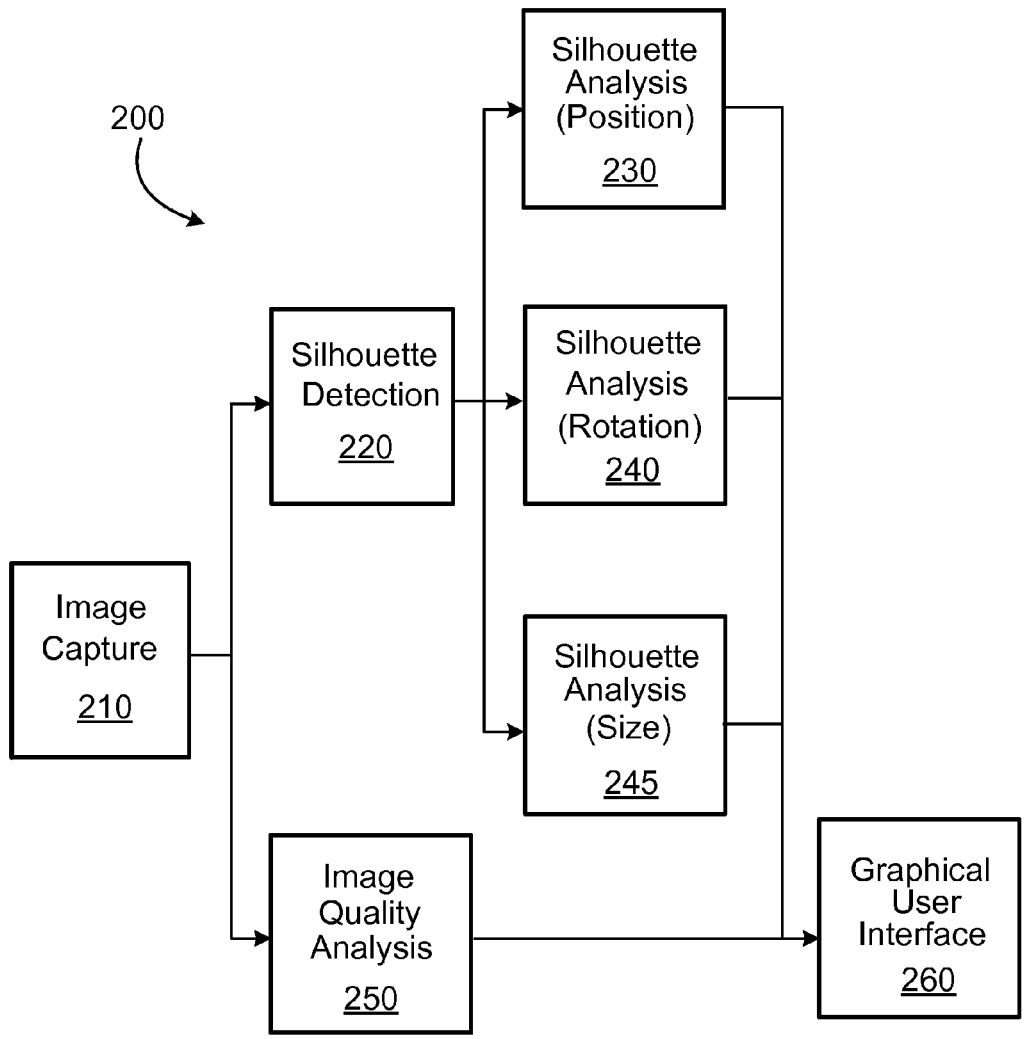
FIG. 2 illustrates an example of an image processing system for creating an preview window.

FIG. 2 shows an example of an image processing system 200 for generating a user's silhouette in the preview window of the GUI in a video conference. The image processing system may be configured from a combination of connected modules. These modules may be configured using electronic devices, software running on at least one electronic storage medium, or a combination thereof.

The image processing system 200 includes an image capture module 210 having an output coupled to an input of a silhouette detection module 220 and an input of an image quality analysis module 250. The image quality analysis module 250 has an output coupled with an input of a graphical user interface (GUI) 260. The silhouette detection module 220 has an output coupled with an input for a silhouette analysis position module 230 an input for a silhouette analysis rotation module 240, and an input for a silhouette analysis size module 245. The silhouette analysis position module 230, the silhouette analysis rotation module 240, and the silhouette analysis size module 245 each have an output coupled to the input of the GUI 260.

In order to generate the user's silhouette, the user's image is inputted into the processing system 200 through the image capture module 210. Image capture may be achieved at any rate, for example, by periodically grabbing the output of a video camera. The image capture module 210 then sends the captured user image to both the silhouette detection module 220 and the image quality analysis module 250. The silhouette detection module 220 determines the user's silhouette from the captured image and sends information for this silhouette to the silhouette analysis position module 230 to perform positional analysis and to the silhouette analysis rotation module 240 to perform rotational analysis. The image quality analysis module 250 determines whether a level of quality of the image to determine whether the quality of the image is suitable for use in generating an icon. The GUI 260 determines the icon that will be generated as the user's silhouette based on input from the analysis position module 230 and the analysis rotation module 240 and input from the image quality analysis module 250. The generated icon can be generally represented as an outline of the head, face, and/or upper body of the user.

In performing the positional analysis, the silhouette analysis position module 230 determines whether the vertical and horizontal two-dimensional (2D) alignment of the user's head is adequately positioned within the camera frame. Determination of the adequate positioning of the user's head can be achieved through use of image processing algorithms that determine the threshold for an appropriate vertical and horizontal alignment of the captured image in the image frame. Determination of optimal positioning can be achieved through use of image processing algorithms that determine the threshold for optimal head positioning with respect to the camera.

The rotational analysis is performed by the silhouette analysis rotation module 240 by determining that a user's face is rotated three dimensionally (3D) in such a manner as to be directed towards an adequate direction with respect to having the user to face towards the camera. Determination of adequate positioning can be achieved through use of image processing algorithms that may examine the proportions of the silhouette and infer rotation based on those proportions, determine the threshold for an appropriate facial rotation.

In some cases, an optimal direction may be determined for when the user looks directly into a camera, however this direction may be determined to cover situations where the user looks towards other off-angle directions with respect to the camera. Determination of optimal positioning can be achieved through use of image processing algorithms that determine the threshold for optimal facial rotation. These algorithms may be further configured to determine threshold conditions for the rotational position of certain facial features with respect to the camera frame. Facial features used for this determination can include features for the nose, the mouth, the chin, the eyes and the ears with respect to other facial features and/or the image frame.

The silhouette analysis size module 245 is configured to compare the silhouette size to the size of the overall image to determine whether the user's face is too close or too far away from the camera. Alternatively, or in addition to the above functionality, the silhouette analysis size module may determine whether the magnification of the camera is too high or too low.

The image quality analysis module 250 is configured to provide feedback information on the image that was captured in the image capture module 210 and can be used to determine whether a captured frame is usable for output as a silhouette. Some criteria used for the determination of feedback information for the captured image may be derived from, for example, use of predictive image quality algorithms or image quality look-up tables. Factors such as white balance, contrast between the foreground and background of the image, and the presence of deep shadows on the face may be incorporated in the image quality algorithms.

The GUI 260 may be configured to generate various icons to represent the user's silhouette. In particular, in addition to representing the user's silhouette as an outline of the user's head, the GUI 260 may represent the user's silhouette as a cartoon image, for example, which can either be a direct representation of the user or another cartoon image which is not a direct representation of the user. The GUI 260 may also generate indicators, based on input from the silhouette analysis position module 230 and the silhouette analysis rotation module 240 that indicate whether the silhouette is appropriately positioned and displayed in the preview window. These indicators may be a presentation of a color, a marker, a pointer, shading, graphics, animation, text, or a combination thereof. In some embodiments, the silhouette may be represented in the preview window as an icon, graphic, a figure or outline of some other object that can be used to provide feedback to the user to correctly position the face, head, and/or the user within the preview window and/or to provide feedback on lighting conditions around the user in the GUI.

Figure 3:
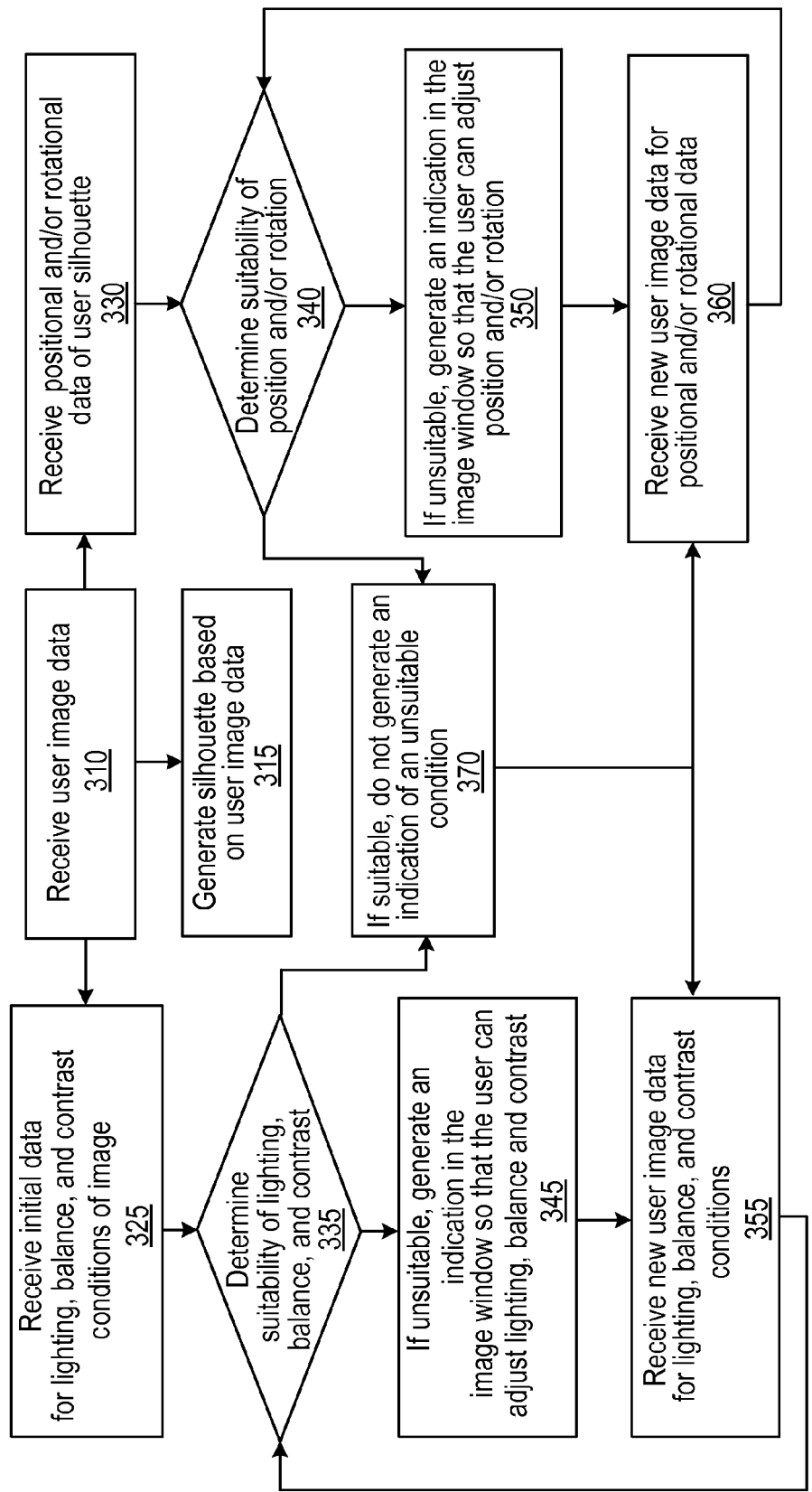
FIG. 3 illustrates an example of a general process flow chart by which information for a preview window is outputted and updated.

FIG. 3 shows a flow chart 300 illustrating a process by which a user's silhouette may be generated. Generally, the operations shown in FIG. 3 may be performed on the image processing system described in FIG. 2. However, the operations may be implemented and performed on other devices in other configurations.

In FIG. 3, data for a user's image is inputted (at 310). A silhouette is generated based on the data for the user's image (at 315) is generated and outputted to the preview window. After 310, the positional and/or rotational data of the user's image is received (at 330). A determination is made (at 340), whether positional and/or rotational data is unsuitable by comparing this data to a threshold or range. If the positional and/or rotational data of the user's image is found to be unsuitable, an indication is generated (at 350) to accompany the generated silhouette. This indication can take the form of a color, a marker, a pointer, a shading, graphics, animation or text indication that the user needs to adjust their facial position, head position and/or rotation in order that it can achieve an appropriate image configuration in the preview window. If the positional and/or rotational data of the user's image is found to be suitable, no indication of an unsuitable condition is generated (at 370) to accompany the generated silhouette. New data for a user's image is received (at 360), thereby updating the received positional and/or rotational data to be determined in 340.

Information for the lighting, balance and contrast conditions of the user's image may be received (at 325). A determination is made (at 335), whether the lighting, balance and contrast conditions are unsuitable by comparing these conditions to a threshold or range. If the lighting, balance and contrast conditions of the user's image are found to be unsuitable, an indication is generated (at 345) to accompany the generated silhouette. This indication can provide feedback information to the user and may be represented as a color, a marker, a pointer, a shading, graphics, animation and/or text indication that the user can use to adjust their lighting, balance and contrast conditions in order to achieve an appropriate image configuration in the video conference. If the lighting, balance and contrast conditions of the user's image are found to be suitable, no indication of an unsuitable condition is generated (at 370) to accompany the generated silhouette. New data for a user's image is received for the lighting, balance and/or contrast conditions (at 355), thereby providing an update for the lighting, balance and contrast conditions to be determined (at 335).

Figure 4A:
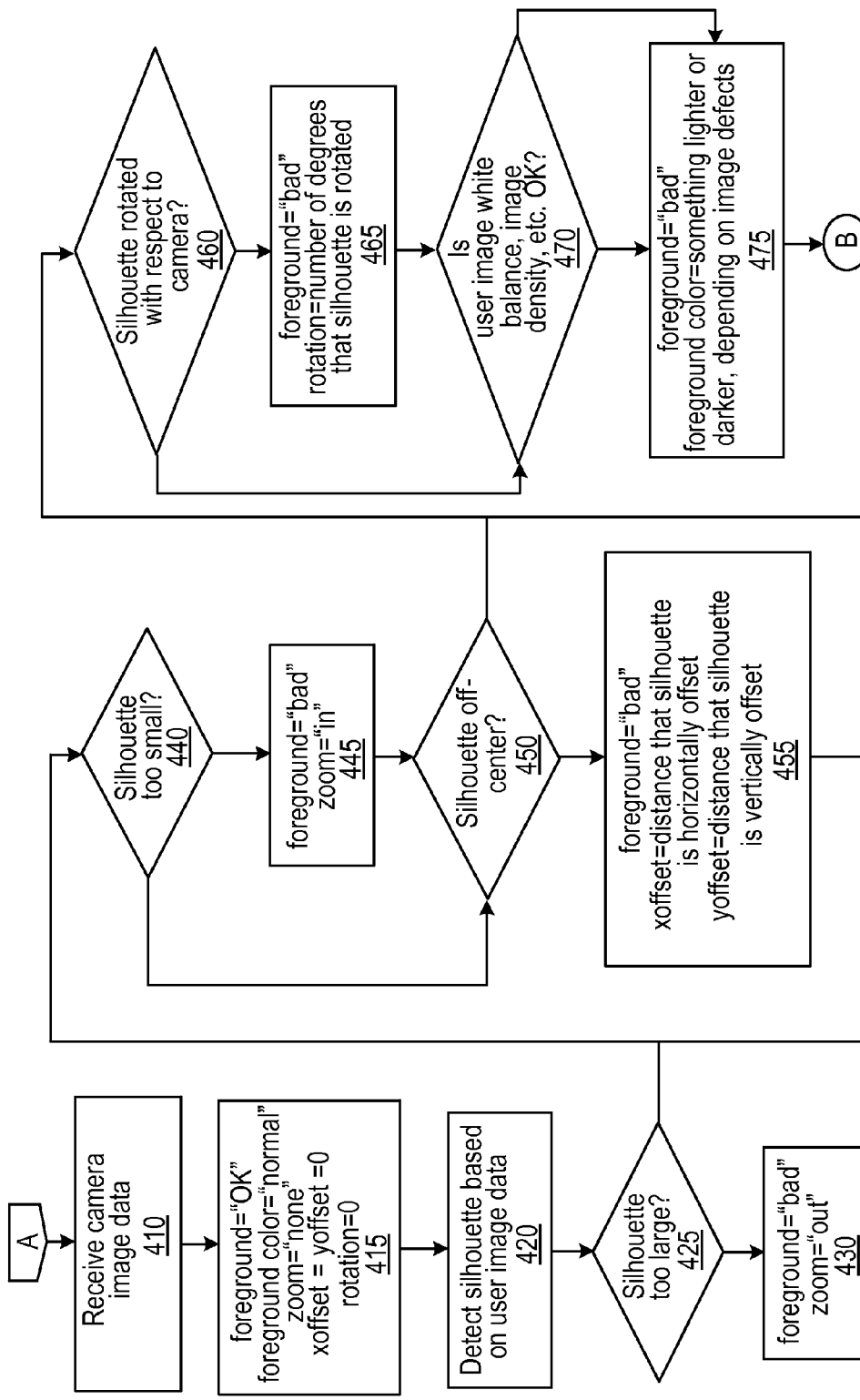
FIGS. 4A and 4B illustrate a detailed process flow for generating the graphical user interfaces illustrated in FIGS. 1B-1G.
Figure 4B:
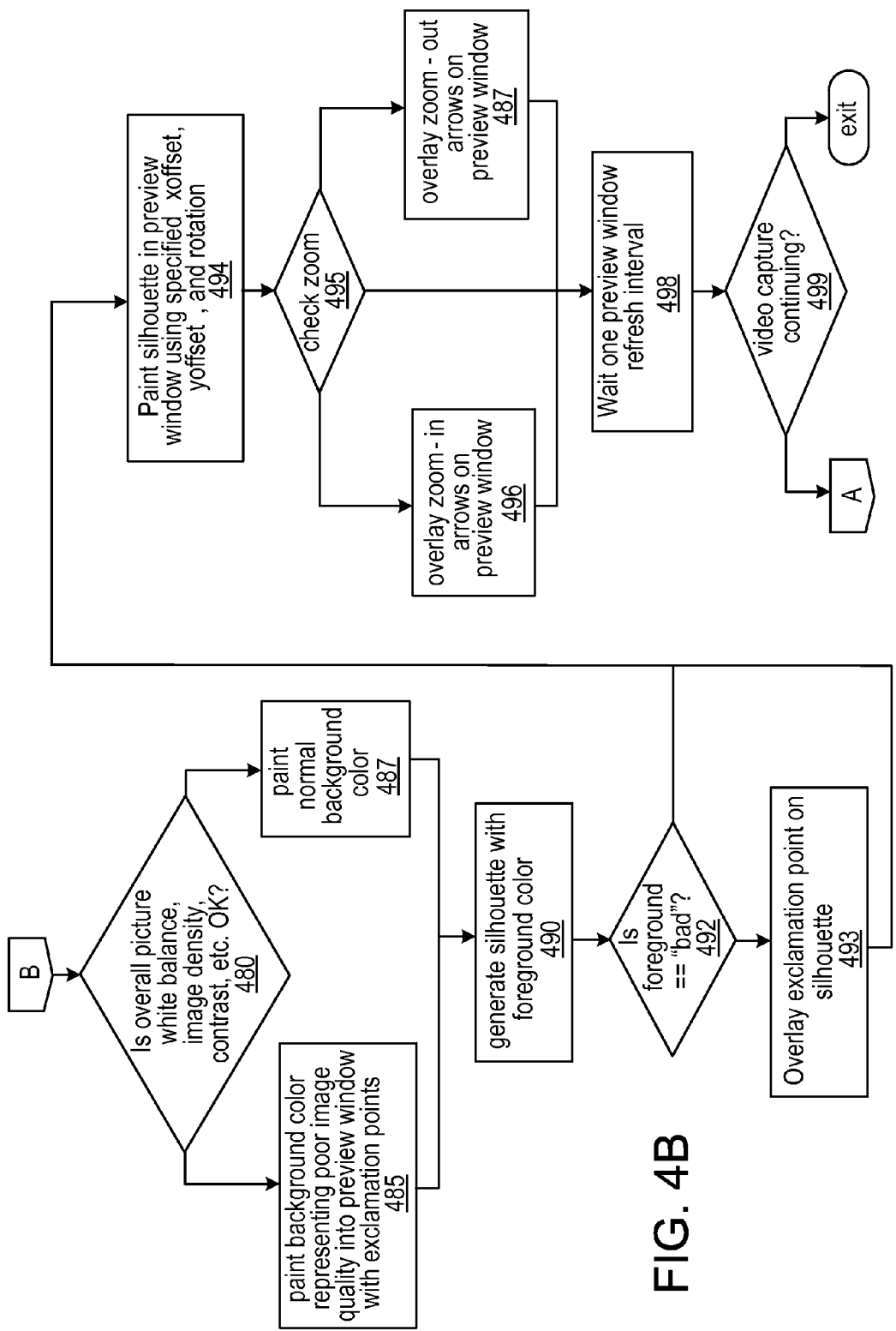

FIGS. 4A and 4B depict an implementation of a process for generating the silhouette-based preview frames illustrated in FIGS. 1B-1G. The process runs continuously until video capture ceases.

In FIG. 4A, a user's image data is received from a camera pointing at the user (at 410). A series of local state variables are then initialized (at 415). The "foreground" variable determines whether the user's image is of acceptable quality, and may be initialized to "OK." The "foreground color" variable contains information pertaining to the color of the silhouette, which may be based on the quality of the image, and initialized to "normal." The "zoom" variable indicates whether zoom-in or zoom-out indicators should be presented in the preview window, and may be initialized to "none." The "xoffset" and "yoffset" describe how off-center the image of the user is, and may be both initialized to 0. "Rotation" describes how many degrees the user's face is rotated from the cameras axis, and may also be initialized to 0. It should be understood that, while the current embodiment only specifies a rotation about a vertical axis, in other implementations, rotation about a horizontal axis may also be computed, thereby indicating whether the position of the camera is too high or too low with respect to the user.

The image is then processed and the user's silhouette is detected (at 420). The silhouette size is checked (at 425) and, if the silhouette size is too large (at 430), the foreground may be marked "bad" and the zoom indicator may be marked to "zoom out," i.e. that the user should decrease the image magnification so that his entire silhouette fits in the preview window. The silhouette is then checked (at 440) to see if it is too small and, if it is (at 445), the foreground may be marked "bad" and the zoom indicator may be marked to zoom in, i.e., that the user should increase image magnification to better utilize the entire video frame.

The silhouette is then checked (at 450) to see whether it is either horizontally or vertically off-center and if it is (at 455), the foreground may be marked "bad" and the xoffset and yoffset variables may be updated with a value indicating how much the image is horizontally and vertically off-centered, respectively. The silhouette may then be checked (at 460) to determine whether the user's image is rotated about a vertical axis. This check may be achieved by using the camera's optical axis to represent a 0 degree reference point. If the image is rotated about a vertical axis (at 465) the foreground may be marked "bad" and the rotation updated with the number of degrees by which the user's image is rotated around the vertical axis through a rotation calculation algorithm.

The user's image may be scanned (at 470) to determine whether the image quality is acceptable. This may be achieved, for instance, by checking the white balance, image density and contrast. If the image quality is poor (at 475), the foreground may be marked as "bad" and the foreground color may be updated with a value that conveys some information about the poor quality of the image. For example, if the image density indicates that the user's face is too dark, the silhouette will be made darker than normal. If the image density indicates that the user's face is too light or washed-out, the silhouette will be made lighter than normal.

FIG. 4B is a continuation of the process described in FIG. 4A. The overall picture quality, including white balance, image density, contrast between foreground and background, and other image quality metrics are determined (at 480) and, if the image overall image quality is poor (at 485), the background may be painted with a color that represents the type of image problem that is present, and exclamation points or icons may be painted over the background to emphasize that the image quality is abnormal. If the overall image quality is good (at step 487), the normal background color is painted.

The silhouette image's color may then be updated (at 490) with the computed foreground color. The "foreground" variable may then be checked (at 492) and, if it is marked "bad" (at 493), the silhouette image may be overlaid with an exclamation point indicating that some problem exists with the user's image. The silhouette may then be painted into the preview window (at 494) at a position specified by "xoffset" and "yoffset" variables, and if necessary, rotated by the amount specified by the "rotation" variable.

The "zoom" variable may then be checked (at 495). If it indicates "zoom in", the preview window (at 496) may be overlaid with a zoom in indicator 126, as illustrated in FIG. 1E. If the "zoom" variable indicates "zoom out", the preview window may be overlaid with a zoom out indicator 124, as depicted in FIG. 1D. A predetermined time interval may then be allowed to elapse (at 498). After the predetermined time interval has elapsed, a check may be performed (at 499) to see if video capture is still continuing. If video capture is not continuing, the process ends. If video capturing is still continuing, the process returns to 410 and the video preview image is again updated.

Figure 5:
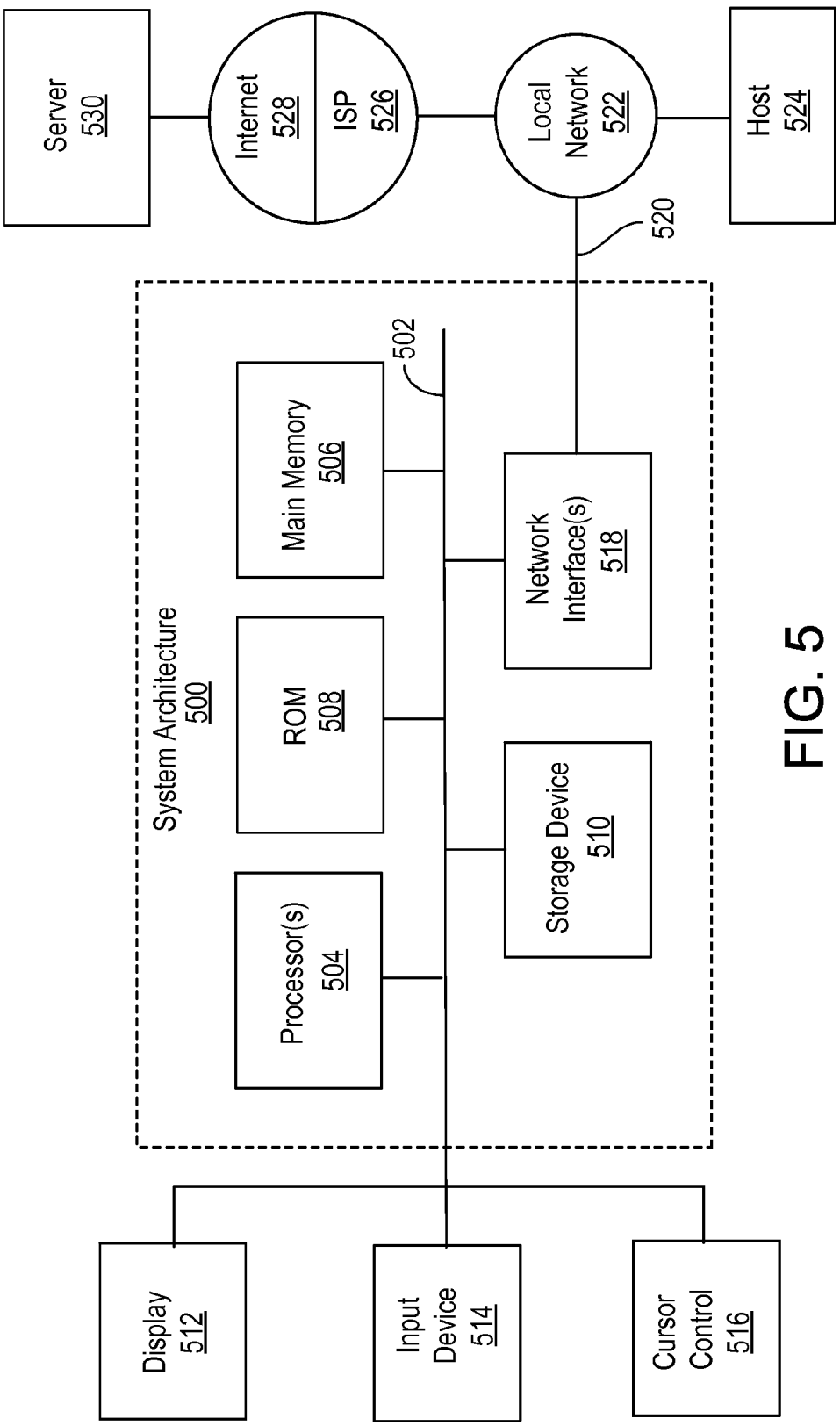
FIG. 5 illustrates an example of a communication system for creating a preview window.

FIG. 5 shows an implementation of a system architecture 500 that may implement the system in FIG. 2 and the process flows in FIG. 3 and in FIGS. 4A-4B. The system architecture 500 may contain at least processor 504 element, a read only memory (ROM) 508 element and a main memory 506 element. In addition, the system architecture 500 can include a storage device 510 element and at least one network interface 518 element. An input/output (I/O) bus 502 may serve to connect all of the elements of system architecture 500 together.

Peripheral elements may be connected to the system architecture 500 via the (I/O) bus 502. In particular, a display 512 element, an input device 514 element and a cursor control 516 element may be connected to (I/O) bus 502. The input device may include various types of image capturing devices such as webcams, digital cameras and video cameras.

Through the at least one network interface 518, a network connection 520 connects the system architecture 500 with a local network 522. The local network 522 is itself connected to a host 524 and an internet service provider 526 and the Internet 528. Through the Internet 528, a connection may be made to at least one server 530 element.

The disclosed and other embodiments can be implemented as one or more computer program products, i.e., one or more modules of computer program instructions encoded on a computer readable medium for execution by, or to control the operation of, data processing apparatus. The one or more modules may be implemented in hardware. The computer readable medium can be a machine-readable storage device, a machine-readable storage substrate, a memory device, or a combination of one or more them. The term "data processing apparatus" may encompass an apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include various forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. Some storage devices may be cloud-based storage devices. The processor and the memory can be supplemented by, or incorporated in, special purpose logic circuitry. The computer may be implemented in a personal computer (PC), a tablet, a portable electronic device, a cell phone (e.g., a smart phone), or some as part of other electronic device that enables the user to view and edit video content.

While this document contains many specifics, these should not be construed as limitations on the scope that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for a preview window in a videoconference, the method comprising:
   presenting a first window and a second window in a graphical user interface (GUI) that is implemented by an image processing system, the first window being configured to present an image of at least a first user in a videoconference;
   receiving, with an image capture module that is implemented by the image processing system, information related to an image condition related to a second user in the videoconference, the image condition is a lighting condition, an image balance condition, an image contrast condition, or a condition relating to a position of a head of the second user with respect to a camera that is configured to capture an image of the head;
   presenting, with the GUI, a silhouette of the second user in the second window;
   determining, by the image processing system, whether the second user should adjust the image condition by comparing the image condition to a threshold image condition;
   based upon determining that the image condition does not meet the threshold image condition,
      presenting, with the GUI, an indication of the image condition in the second window, wherein the indication of the image condition is a presentation of a color, a marker, a pointer, a shading, graphics, animation or text to provide to the second user feedback on how to adjust the image conditions in order to achieve an appropriate image configuration in the videoconference, and
      periodically checking the image condition to periodically update the received information related to the image condition of the second user in the videoconference until the image condition is met; and
   based upon determining that the image condition does meet the threshold image condition, presenting, with the GUI, the silhouette of the second user in the second window without presenting the presentation of the indication of the image condition in the second window.

2. The method of claim 1, further comprising:
   presenting the first and second windows concurrently in the videoconference, wherein the second window is configured to present the indication of the image condition in the second window,
   presenting the second user with an option to view the silhouette of the second user in the second window;
   receiving a selection from the second user to view the silhouette of the second user in the second window; and
   based upon receiving the selection, presenting the view of the silhouette of the second user in the second window.

3. The method of claim 1, wherein the silhouette of the second user is presented in the second window as at least one of:
   an outline of at least the head of the second user; and
   an icon.

4. The method of claim 1, further comprising:
receiving information relating to an image of at least the head of the second user; and
using the received information relating to the image of at least the head of the second user to generate the silhouette, the silhouette comprising a graphical representation of an outline of the head of the second user.

5. The method of claim 1, further comprising, based upon determining that the image condition does not meet the threshold image condition with respect to the position of the head of the second user, present a misalignment indicator to the second user to indicate that the head of the user is misaligned with respect to the camera.

6. A method for a preview window in a videoconference, the method comprising:
presenting a first window and a second window in a graphical user interface (GUI) that is implemented by an image processing system, the first window being configured to present an image of at least a first user in a videoconference;
receiving, with an image capture module that is implemented by the image processing system, information related to an image condition related to a second user in the videoconference, the image condition is a positional condition of the second user within the second window or a rotational condition of the second user within the second window, wherein the rotational condition relates to whether a head of the second user is turned sideways to a camera that captures an image of the head to present in the second window;
presenting, with the GUI, a silhouette of the second user in the second window;
determining, by the image processing system, whether the second user should adjust the image condition by comparing the image condition to a threshold image condition;
based upon determining that the image condition does not meet the threshold image condition,
presenting, with the GUI, an indication of the image condition in the second window, wherein the indication of the image condition is a presentation of a color, a marker, a pointer, a shading, graphics, animation and or text to provide to the second user feedback on how to adjust the image conditions in order to achieve an appropriate image configuration in the videoconference, and
periodically checking the image condition to periodically update the received information related to the image condition of the second user in the videoconference until the image condition is met; and
based upon determining that the image condition does meet the threshold image condition, presenting, with the GUI, the silhouette of the second user in the second window without presenting the presentation of the indication of the image condition in the second window.

7. The method of claim 6, wherein the positional condition comprises information relating to a two-dimensional alignment of the head of the second user.

8. The method of claim 6, wherein the rotational condition comprises information relating to a three-dimensional alignment of the head of the second user.

9. The method of claim 6, further comprising:
presenting the first and second windows concurrently in the videoconference, wherein the second window is configured to present the indication of the image condition in the second window,
presenting the second user with an option to view the silhouette of the second user in the second window;
receiving a selection from the second user to view the silhouette of the second user in the second window; and
based upon receiving the selection, presenting the view of the silhouette of the second user in the second window.

10. A non-transitory computer program stored on a computer readable medium for a preview window in a videoconference, the computer program comprising instructions that when executed on a processor cause the processor to perform operations that include:
presenting a first window and a second window in a graphical user interface (GUI) that is implemented by an image processing system, the first window being configured to present an image of at least a first user in a videoconference;
receiving information related to an image condition related to a second user in the videoconference, the image condition is a lighting condition, an image balance condition, an image contrast condition, or a condition relating to a position of a head of the second user with respect to a camera that is configured to capture an image of the head;
presenting a silhouette of the second user in the second window;
determining, by the image processing system, whether the second user should adjust the image condition by comparing the image condition to a threshold image condition;
based upon determining that the image condition does not meet the threshold image condition,
presenting an indication of the image condition in the second window, wherein the indication of the image condition is a presentation of a color, a marker, a pointer, a shading, graphics, animation or text to provide to the second user feedback on how to adjust the image conditions in order to achieve an appropriate image configuration in the videoconference, and
periodically checking the image condition to periodically update the received information related to the image condition of the second user in the videoconference until the image condition is met; and
based upon determining that the image condition does meet the threshold image condition, presenting the silhouette of the second user in the second window without presenting the presentation of the indication of the image condition in the second window.

11. A non-transitory computer program stored on a computer readable medium for a preview window in a videoconference, the computer program comprising instructions that when executed on a processor cause the processor to perform operations that include:
presenting a first window and a second window in a graphical user interface (GUI) that is implemented by an image processing system, the first window being configured to present an image of at least a first user in a videoconference;
receiving information related to an image condition related to a second user in the videoconference, the image condition is a positional condition of the second user within the second window or a rotational condition of the second user within the second window, wherein the rotational condition relates to whether a head of the second user is turned sideways to a camera that captures an image of the head to present in the second window;
presenting a silhouette of the second user in the second window;

determining, by the image processing system, whether the second user should adjust the image condition by comparing the image condition to a threshold image condition;

based upon determining that the image condition does not meet the threshold image condition,
  presenting an indication of the image condition in the second window, wherein the indication of the image condition is a presentation of a color, a marker, a pointer, a shading, graphics, animation or text to provide to the second user feedback on how to adjust the image conditions in order to achieve an appropriate image configuration in the videoconference, and
  periodically checking the image condition to periodically update the received information related to the image condition of the second user in the videoconference until the image condition is met; and based upon determining that the image condition does meet the threshold image condition, presenting the silhouette of the second user in the second window without presenting the presentation of the indication of the image condition in the second window.

12. The computer program of claim 11, wherein the positional condition comprises information relating to a two-dimensional alignment of the head of the second user.

13. The computer program of claim 11, wherein the rotational condition comprises information relating to a three-dimensional alignment of the head of the second user.

14. The computer program of claim 11, further comprising:
  presenting the first and second windows concurrently in the videoconference, wherein the second window is configured to present the indication of the image condition in the second window,
  presenting the second user with an option to view the silhouette of the second user in the second window;
  receiving a selection from the second user to view the silhouette of the second user in the second window; and
  based upon receiving the selection, presenting the view of the silhouette of the second user in the second window.

15. An image processing system for generating a preview window in a video conference, the system comprising:
  an image capture module configured to receive information related to an image condition related to a second user in the videoconference, the image condition is a positional condition of the second user within a second window or a rotational condition of the second user within the second window, wherein the rotational condition relates to whether a head of the second user is turned sideways to a camera that captures an image of the head to present in the second window;
  a silhouette detection module, connected to the image capture module, configured to determine a silhouette for the second user in the second window;
  a silhouette analysis position module, connected to the silhouette detection module, configured to determine whether the second user should adjust the positional condition of the image by comparing the positional condition to a threshold positional image condition;
  a silhouette analysis rotation module, connected to the silhouette detection module, configured to determine whether the second user should adjust the rotational condition of the image by comparing the rotational condition to a threshold rotational image condition; and
  a graphical user interface (GUI), connected to the silhouette analysis position module and the silhouette analysis rotation module, configured to:
    present a first window and the second window, the first window being configured to present an image of at least a first user in a videoconference, and
    based upon a determination that at least one of the positional condition does not meet the threshold positional image condition and the rotational condition does not meet the threshold rotational image condition,
      output an indication of the image condition in the second window, wherein the indication of the image condition is a presentation of a color, a marker, a pointer, a shading, graphics, animation and or text to provide to the second user feedback on how to adjust the image conditions in order to achieve an appropriate image configuration in the videoconference, and
      periodically check the image condition to periodically update the received information related to the image condition of the second user in the videoconference until the image condition is met.

* * * * *